(12) United States Patent
Fuss et al.

(10) Patent No.: US 12,170,648 B2
(45) Date of Patent: Dec. 17, 2024

(54) DEVICE AND METHOD FOR CONTROLLING THE ACCESS TO AN ELECTRICAL DEVICE

(71) Applicant: BSH Hausgeraete GmbH, Munich (DE)

(72) Inventors: Oliver Fuss, Munich (DE); Joerg Schmidl, Munich (DE); Christoph Soellner, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 197 days.

(21) Appl. No.: 17/910,080

(22) PCT Filed: Feb. 18, 2021

(86) PCT No.: PCT/EP2021/053949
§ 371 (c)(1),
(2) Date: Sep. 8, 2022

(87) PCT Pub. No.: WO2021/180439
PCT Pub. Date: Sep. 16, 2021

(65) Prior Publication Data
US 2023/0106870 A1 Apr. 6, 2023

(30) Foreign Application Priority Data
Mar. 10, 2020 (DE) .................. 10 2020 203 031.6

(51) Int. Cl.
*G06F 21/00* (2013.01)
*H04L 9/40* (2022.01)
(Continued)

(52) U.S. Cl.
CPC ...... *H04L 63/0236* (2013.01); *H04L 63/0876* (2013.01); *H04W 12/63* (2021.01); *H04L 12/2807* (2013.01)

(58) Field of Classification Search
None
See application file for complete search history.

(56) References Cited

U.S. PATENT DOCUMENTS 7,363,031 B1 * 4/2008 Aisa .................. H02J 13/00002
455/418
7,653,443 B2 * 1/2010 Flohr .................. H02J 3/14
700/16
(Continued)

FOREIGN PATENT DOCUMENTS

CN 1369990 A 9/2002
CN 1701567 A 11/2005
(Continued)

*Primary Examiner* — Maung T Lwin
(74) *Attorney, Agent, or Firm* — Laurence A. Greenberg; Werner H. Stemer; Ralph E. Locher

(57) ABSTRACT

An apparatus for controlling the access of a user device to an electrical appliance. The apparatus is configured to determine electrical appliance data relating to data communication of the electrical appliance and to determine user device data relating to data communication of the user device. Furthermore, the apparatus is configured to determine, based on the electrical appliance data and on the user device data, whether or not the electrical appliance and the user device are in a common local communication network. The apparatus allows the user device to access the electrical appliance if it is determined that the electrical appliance and the user device are present in a common local communication network.

13 Claims, 2 Drawing Sheets

(51) Int. Cl.
*H04W 12/63* (2021.01)
*H04L 12/28* (2006.01)

(56) References Cited

U.S. PATENT DOCUMENTS

| | | | |
|---|---|---|---|
| 7,805,526 | B2 | 9/2010 | Takabayashi et al. |
| 8,032,129 | B2* | 10/2011 | Bae .................. H04L 12/2809 |
| | | | 455/414.3 |
| 8,316,237 | B1* | 11/2012 | Felsher ............... H04L 63/061 |
| | | | 380/282 |
| 9,179,239 | B2* | 11/2015 | Morgaine ............... H04W 4/50 |
| 9,210,192 | B1* | 12/2015 | Kim ..................... H04W 12/08 |
| 9,918,351 | B2* | 3/2018 | Kim ..................... H04W 48/18 |
| 2005/0228894 | A1 | 10/2005 | Takabayashi et al. |
| 2007/0081530 | A1 | 4/2007 | Nomura et al. |
| 2008/0289009 | A1 | 11/2008 | Lee et al. |
| 2010/0161964 | A1* | 6/2010 | Dodgson ............. G06F 21/6272 |
| | | | 711/E12.001 |
| 2013/0297766 | A1* | 11/2013 | Maity .................... H04L 67/51 |
| | | | 709/223 |
| 2014/0214974 | A1* | 7/2014 | Kurzanski ............. G06Q 10/10 |
| | | | 709/206 |
| 2014/0259047 | A1 | 9/2014 | Bakar et al. |
| 2017/0008162 | A1* | 1/2017 | Tsubota ................. H04L 12/12 |
| 2017/0345420 | A1* | 11/2017 | Barnett, Jr. ......... G10L 15/1815 |
| 2018/0295405 | A1* | 10/2018 | Barnett, Jr. ........ H04N 21/4122 |

FOREIGN PATENT DOCUMENTS

| | | |
|---|---|---|
| CN | 101902826 A | 12/2010 |
| CN | 102954564 A | 3/2013 |
| EP | 2634970 A2 | 9/2013 |
| EP | 2814273 A1 | 12/2014 |
| EP | 2913961 A1 | 9/2015 |
| EP | 3024193 A1 | 5/2016 |
| WO | 2005027438 A1 | 11/2006 |
| WO | 2018116123 A1 | 6/2018 |
| WO | 2020011519 A1 | 1/2020 |

* cited by examiner

DEVICE AND METHOD FOR CONTROLLING THE ACCESS TO AN ELECTRICAL DEVICE

FIELD AND BACKGROUND OF THE INVENTION

The present document describes an apparatus and a corresponding method which can be used in an efficient and reliable manner to determine the position and/or the relative local proximity of a mobile user device relative to an electrical appliance, for example to a household appliance, in particular in order to render possible or to prevent interaction of the user device with the electrical appliance.

A household appliance, for example a washing machine, a dishwasher or an oven, typically comprises a user interface that enables a user to interact with the household appliance, for example, in order to select an operating program of the household appliance and/or in order to start the operation of the household appliance. The user interface can comprise different interaction components, such as for example a screen and multiple (mechanical) operating elements. These components are encumbered with costs, both during the production of the household appliance and also during maintenance of the household appliance.

One possibility of reducing the costs of a household appliance and/or of increasing the operating comfort of a household appliance is a user interface of the household appliance via a mobile user device (for example via a smartphone) of a user of the household appliance. It is then possible, where appropriate, to forego the installation of a user interface in the household appliance.

SUMMARY OF THE INVENTION

The present document is concerned with the technical object of rendering possible a safe and reliable operation of an electrical appliance, in particular of a household appliance, via a (where appropriate mobile) user device.

The object is achieved in each case by the subject matters of the independent claim. Advantageous embodiments are defined in particular in the dependent claims, described in the description below or illustrated in the attached drawing.

In accordance with one aspect of the invention, an apparatus (for example a server) is described for controlling the access to the electrical appliance, in particular to a household appliance, by a (where appropriate mobile) user device. The household appliance can comprise a washing machine, a dryer, a dishwasher, an oven, a hob, a cleaning robot, a fridge, a coffee machine and/or a food processor. As an alternative or in addition thereto, the electrical appliance can comprise an appliance for home automation, in particular a light controller and/or ventilation controller, and/or a television. The user device can comprise a smartphone or a tablet PC or a desktop PC or a laptop PC or another smart device. The apparatus can be configured to communicate with the electrical appliance and the user device via a communication network.

The apparatus can be configured so as to determine electrical appliance data with regard to a data communication of the electrical appliance. In this case, the data communication can be performed with the apparatus and/or with one or multiple other appliances/devices. The electrical appliance data can be transmitted by the electrical appliance to the apparatus. As an alternative or in addition thereto, the electrical appliance data can be determined directly by the apparatus.

Furthermore, the apparatus can be configured so as to determine user device data with regard to a data communication of the user device. In this case, the data communication can be performed with the apparatus and/or with one or multiple other appliances/devices. The user device data can be transmitted by the user device to the apparatus. As an alternative or in addition thereto, the user device data can be determined directly by the apparatus.

Moreover, the apparatus can be configured so as, on the basis of the electrical appliance data and on the basis of the user device data, to establish whether the electrical appliance and the user device are in a common local communication network or not. In this case, the common local communication network can be a local area network, in short LAN, or a wireless LAN, in short WLAN.

In addition, the apparatus can be configured so as to render possible an access of the user device to the electrical appliance (where appropriate only) if it is established that the electrical appliance and the user device are in a common local communications network. On the other hand, the apparatus can be configured so as to prevent an access of the user device to the electrical appliance if it is established that the electrical appliance and the user device are not in a common local communication network.

In particular, the apparatus can be configured so as to render it possible that a user interface of the electrical appliance is provided via the user device, (and a user can operate the electrical appliance via said user interface) if it is established that the electrical appliance and the user device are in a common local communication network. Furthermore, the apparatus can be configured so as to prevent that the user device can be used as a user interface of the electrical appliance if it is established that the electrical appliance and the user device are not in a common local communication network.

The apparatus is consequently configured so as via the electrical appliance data and the user device data to check whether the user device is located in the spatial proximity to (in other words is within the same local communication network with) the electrical appliance. Only in this case is the user device allowed access to the electrical appliance, for example in order to control the electrical appliance. Thus, a reliable and safe operation of an electrical appliance is rendered possible. Moreover, it is thus possible, where appropriate, to forego the installation of a user interface in the electrical appliance.

The electrical appliance data can indicate at least a part of a first IP address via which the electrical appliance can be reached by a communication partner outside the local communication network in which the electrical appliance is arranged, (in particular by the apparatus). In a corresponding manner, the user device data can display a part of a second IP address via which the user device can be reached by a communication partner outside the local communication network in which the user device is arranged (in particular by the apparatus). In this case, the part of the first IP address and/or the part of the second IP address can each comprise a public IPv4 address or a prefix of an IPv6 address.

The apparatus can be configured so as to compare the first IP address with the second IP address in order to establish in a particularly reliable manner whether the electrical appliance and the user device are located in a common local communication network or not.

As an alternative or in addition thereto, the electrical appliance data can comprise a first run time of a data communication of the electrical appliance with the apparatus. In a corresponding manner, the user device data can comprise a second run time of a data communication of the user device with the apparatus. In this case, the run times can be average run times for a plurality of items of information (in order to compensate statistical fluctuations with regard to the run times).

The apparatus can be configured so as to compare the first run time and the second run time with one another in order to establish whether the electrical appliance and the user device are located in a common local communication network or not. In this case, it is possible to establish that the electrical appliance and the user device are arranged in a common local communication network if the first run time and the second run time deviate from one another by less than a deviation threshold. On the other hand, it is possible to establish that the electrical appliance and the user device are not arranged in a common local communication network if the first run time and the second run time deviate from one another by more than the deviation threshold. By taking into consideration run times (in particular latencies), it is possible to establish in a particularly reliable manner whether the electrical appliance and the user device are located in a common local communication network.

The electrical appliance data can indicate a first host name of a host via which it is possible to communicate with the electrical appliance. In a corresponding manner, the user device data can indicate a second host name of a host via which it is possible to communicate with the user device. The host names can be determined by means of a reverse DNS look-up, for example.

The apparatus can be configured so as to compare the first host name and the second host name with one another in order (in a particularly reliable manner) to establish whether the electrical appliance and the user device are located in a common local communication network or not.

The electrical appliance data can comprise a first list of other appliances/devices which communicate within the local communication network in which the electrical appliance is arranged. The first list can be determined by the electrical appliance and be transmitted to the apparatus. In a corresponding manner, the user device data can comprise a second list of other appliances/devices which communicate within the local communication network in which the user device is arranged. The second list can be determined by the user device and can be transmitted to the apparatus. In this case, the first list and the second list can each comprise MAC addresses of one or multiple other appliances/devices.

The apparatus can be configured so as on the basis of the first list and on the basis of the second list to establish whether the electrical appliance and the user device are located in a common local communication network or not. In particular, the apparatus can be configured so as to determine an extent of the overlap or overlapping of the first list and the second list. It is then possible in a particularly precise manner on the basis of the extent of the overlap to establish whether the electrical appliance and the user device are located in a common local communication network or not. For example, it is possible to establish that the electrical appliance and the user device are located in a common local communication network if the extent of the overlap is greater than a specific overlap threshold value (for example 80%). On the other hand, it is possible to establish that the electrical appliance and the user device are not located in a common local communication network if the extent of the overlap is less than the overlap threshold value. It is thus possible to determine with a particularly high degree of accuracy whether the electrical appliance and the user device are located in a common local communication network or not.

In accordance with a further aspect of the invention, a method is described for controlling the access to an electrical appliance by a (where appropriate mobile) user device. The method comprises determining electrical appliance data with regard to a data communication of the electrical appliance. Furthermore, the method comprises determining user device data with regard to a data communication of the user device. Moreover, the method comprises establishing, on the basis of the electrical appliance data and on the basis of the user device data whether the electrical appliance and the user device are located in a common local communication network or not. In addition, the method comprises allowing an access of the user device to the electrical appliance if it is established that the electrical appliance and the user device are located in a common local communication network.

It is to be noted that any aspects of the apparatus that are described in this document and of the method that is described in this document can be combined with one another in numerous ways. In particular, the features of the claims can be combined with one another in numerous ways.

Furthermore, the invention is described in detail with the aid of exemplary embodiments that are illustrated in the attached drawing. In the drawing:

DETAILED DESCRIPTION OF THE INVENTION

Figure 1:
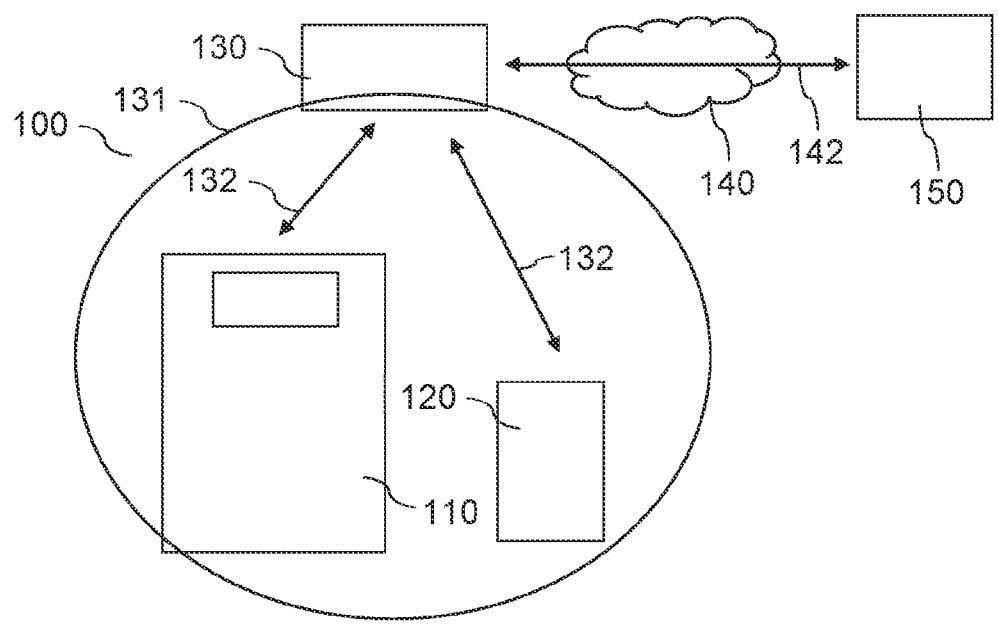
FIG. 1 shows a block diagram of an exemplary system for the remote control of a household appliance (as an example for an electrical appliance)

As explained in the introduction, the present document is concerned with the safe and reliable control of a household appliance (as an example for an electrical appliance) with the aid of a mobile user device. In this connection, FIG. 1 illustrates an exemplary system 100 having a household appliance 110 (as an example for an electrical appliance) and a (where appropriate mobile) user device 120 (for example a smartphone). In order to render possible a safe operation of the household appliance 110 via a software application on the user device 120, it is possible to set a condition such that the operation is only rendered possible if the user device 120 is located in the proximity of the household appliance 110. In particular, it can be required as a condition that the household appliance 110 and the user device 120 are located within the same local network 131, in particular within the same local area network (LAN) or Wireless LAN.

FIG. 1 illustrates an exemplary router 130 that is designed so as to connect with one another different appliances/devices 110, 120, in particular the household appliance 110 and the user device 120, within a local network 131. In other words, the router 130 renders possible a communication of the household appliance 110 and the user device 120 within a common local network 131. For this purpose, the household appliance 110 and the user device 120 can each be connected to the router 130 via a local communication connection 132. The route 130 can render possible a remote communication connection 142 via the internet 140 with a central unit 150 (for example with a backend server). The central unit 150 is also referred to in this document as the "apparatus". The household appliance 110 and the user device 120 can be designed so as to communicate with one another via the central unit 150. In particular, a control of the household appliance 110 by the user device 120 via the central unit 150 can be rendered possible. As an alternative or in addition thereto, data can be transmitted by the household appliance 110 to the user device 120 (indirectly) via the central unit 150.

The central unit 150 can be designed so as to check whether the household appliance 110 and the user device 120 are located in the same local network 131 or not. For this purpose, the household appliance 110 and the user device 120 can each create a communication connection 132, 142 to the central unit 150. One or multiple parameters of the respective communication connection 132, 142 can be determined in order to check whether both the appliance 110 and the device 120 are located in the same local network 131 or not.

If it is established that the household appliance 110 and the user device 120 are located in the same local network 131, it is then rendered possible for the user device 120 to access the household appliance 110 and/or to control the household appliance 110. If on the other hand, it is recognized that the household appliance 110 and the user device 120 are not located in the same local network 131, then it is possible to prevent access to the household appliance 110. A safe control of the household appliance 110 by a mobile user device 120 is thus rendered possible.

On the basis of one or multiple parameters of the communication connections 132, 142 of the household appliance 110 or of the user device 120 with the central unit 150, it is possible to check whether both the appliance 110 and the device 120 are located in the same local network 131 or not.

Exemplary parameters are client-determined parameters. These comprise data values that themselves determine the respective clients (in other words the user device 120 or the household appliance 110). However, where appropriate, these parameters can be manipulated, with the result that a client-determined parameter can typically be used only as an (additional) indicator in order to establish if both the appliance 110 and the device 120 are located in the same local network 131. By way of example, client-determined parameters are:

BSSID (basic service set identification): a 6 byte long MAC address of the WLAN access points 130 to which the respective appliance/device, 110, 120 is connected. This parameter is not available for wire-connected appliances/devices and not available when a repeater is used in a WLAN.

SSID (service set identified): a character chain up to 32 byte long that provides a human-readable value for the network name. In this case, it is to be noted that possibly a repeater has a different network name and consequently possibly different SSIDs can be determined, even though both the appliance 110 and the device 120 are located in the same local network 131.

Visible WLAN-SSID.

Geolocation: via the sensor system ("GPS") or via software-based method ("IP-location data base) determined approximate position of the respective client. However, this requires an appropriate sensor system to be installed in a household appliance 110.

On the other hand, it is possible in a reliable manner using one or multiple server-determined parameters (that can be determined by the central unit 150) to check whether both the appliance 110 and the device 120 are located in the same local network 131. Exemplary server-determined parameters are:

The remote IP address of the connection 142 between the respective appliance 110 and device 120 and the central unit 150. The household appliance 110 and the user device 120 each create a bi-directional communication connection 132, 142 to the central unit 150. It is then possible to determine the (external) IP address of the respective appliance/device 110, 120 (that corresponds typically to the (external) IP address of the router 130) (even if both the appliance 110 and the device 120 use different IP protocols, in other words IPv4 and IPv6). It is thus possible in a reliable manner to determine whether both the appliance 110 and the device 120 are located in the same local network 131.

Latency or run time of the respective communication connection 132, 142 on an application layer level. The central unit 150 can be configured so as to repeatedly, in particular periodically, check how long the user device 120 or the household appliance 110 require in order to respond to a query (for example a so-called "ping"). If both the appliance 110 and the device 120 are arranged in the same local network 131, the response times (in other words the run times) of both the appliance 110 and the device 120 should then be approximately the same. In this case, where appropriate, average values, in particular sliding average values, can be determined and compared via the response times by multiple queries. It is thus possible to compensate for statistical fluctuations.

DNS (domain name server)—entry and/or host name. It is possible to perform for IP addresses a so-called reverse DNS look-up that determines the allocated host name (s) for a specific IP address. This can be performed regardless of which IP version is used respectively.

Within the scope of the IP version IPv4, a router 130 typically has a single public IPv4 address that is used for the communication connection 132, 142 of the user device 120 and for the communication connection 132, 142 of the household appliance 110 if both the appliance 110 and the device 120 are connected to the same router 130.

In the case of the IP-version IPv6, a 64 bit long prefix is typically assigned to a local network 131 and said prefix will be allocated to all the clients 110, 120 in the local network 131. The individual clients 110, 120 use the prefix in their IPv6 addresses and are thus assigned unambiguously to the local network 131. Consequently, it is possible in a reliable manner on the basis of the prefixes of the IP address to check whether both the appliance 110 and the device 120 are located in the same local network 131 or not.

Figure 2:
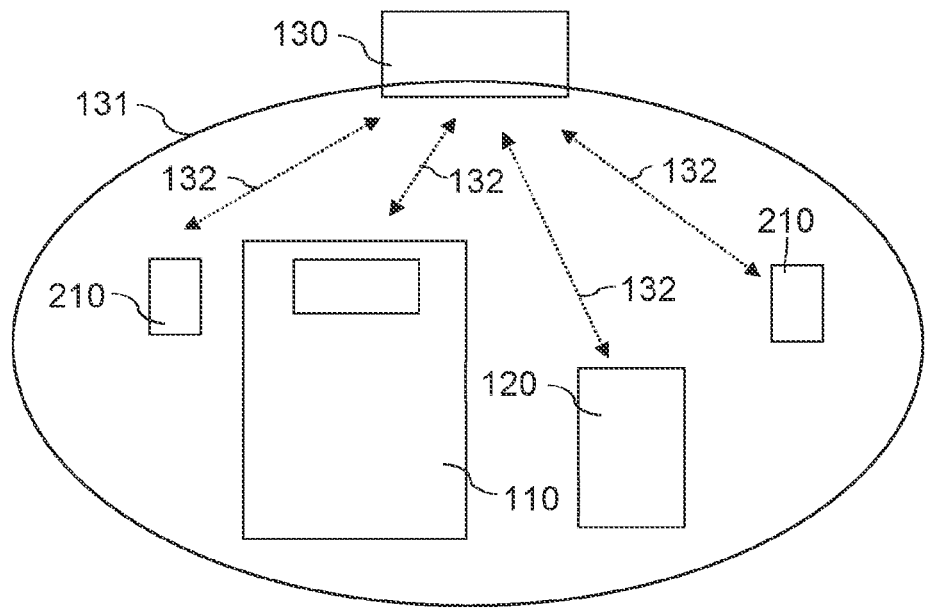
FIG. 2 shows an exemplary local network in a household.

As an alternative or in addition thereto, it is possible to determine parameters of the network connections 132, 142 of the household appliance 110 and of the user device 120 at the respective access point 130 and to one or multiple other appliances/devices 210 in the environment, as illustrated by way of example in FIG. 2. The parameters can be transmitted to the central unit 150 and the central unit 150 can be configured so as, based on the parameters, to check whether the household appliance 110 and the user device 120 are located in the same local network 131 or not.

It is possible to simultaneously read meta information regarding the data traffic in the local network 131 (in particular LAN or WLAN) of the household appliance 110 or of the user device 120 with one or multiple other appliances/devices 210. In this case, it may not be possible to decode the user data on account of an (optional) encoding but the communication partners 210 can be identified on account of their respective appliance/device address, in particular of the respective MAC address.

The household appliance 110 and the user device 120 can each be configured so as in a so-called monitor mode to observe the data traffic within the respective local network 131. In this case, it is possible to determine the sender MAC address and the receiver MAC address respectively for the individual data connections. The household appliance 110 and the user device 120 can consequently each determine a list of sender MAC addresses and receiver MAC addresses of other appliances/devices 210 that are communicating in the respective local network 131. In this case, it is possible on the basis of the service set identifier (SSID) to check whether a different appliance/device 210 is located in the same local network 131 or not.

The lists of MAC addresses of the user device 120 and of the household appliance 110 can be transmitted to the central unit 150 and compared by the central unit 150. It is then possible to determine the extent to which the two lists overlap. If the extent of the overlap of the other appliances/devices 210 in the two lists is greater than an overlap threshold (for example 80% or more) then it is possible to conclude therefrom that the user device 120 and the household appliance 110 are located in the same local network 131. Furthermore, it is possible to check as an additional criterion whether the household appliance 110 and the user device 120 are connected to the same access point 130 and/or to the same SSID. This can be checked on the basis of the basic service set identifiers (BSSID).

The extent of the overlap of the two lists of appliances/devices 210, in other words the determination of the overlap of the two lists of appliances/devices 210, provides a reliable criterion in order to check whether the household appliance 110 and the user device 120 are located in the same local network 131. In particular, this criterion is relatively safe with regard to relay attacks.

Where appropriate, another appliance/device 210 can be connected indirectly via a repeater to the router 130. In this case, where appropriate, the repeater can have another SSID. Nevertheless, a list of MAC addresses of the devices 210 that are seen by the respective appliance 110/device 120 can be determined by the household appliance 110 or by the user device 120 respectively. In this case, where appropriate, other appliances/devices 210 that communicate with one another exclusively via the repeater cannot be seen by the household appliance 110 or by the user device 120.

Where appropriate, when using a repeater it is possible to use a so-called extended service set identifier (ESSID) in order to show that all access devices (repeater, router 130 etc.) emit the same SSID in order to inform WLAN clients of the name of the network 131. In this case, it is possible on the basis of the ESSID to determine in a reliable manner whether another appliance/device 210 is located in the same local network 131 as the household appliance 110 or the user device 120.

Figure 3:
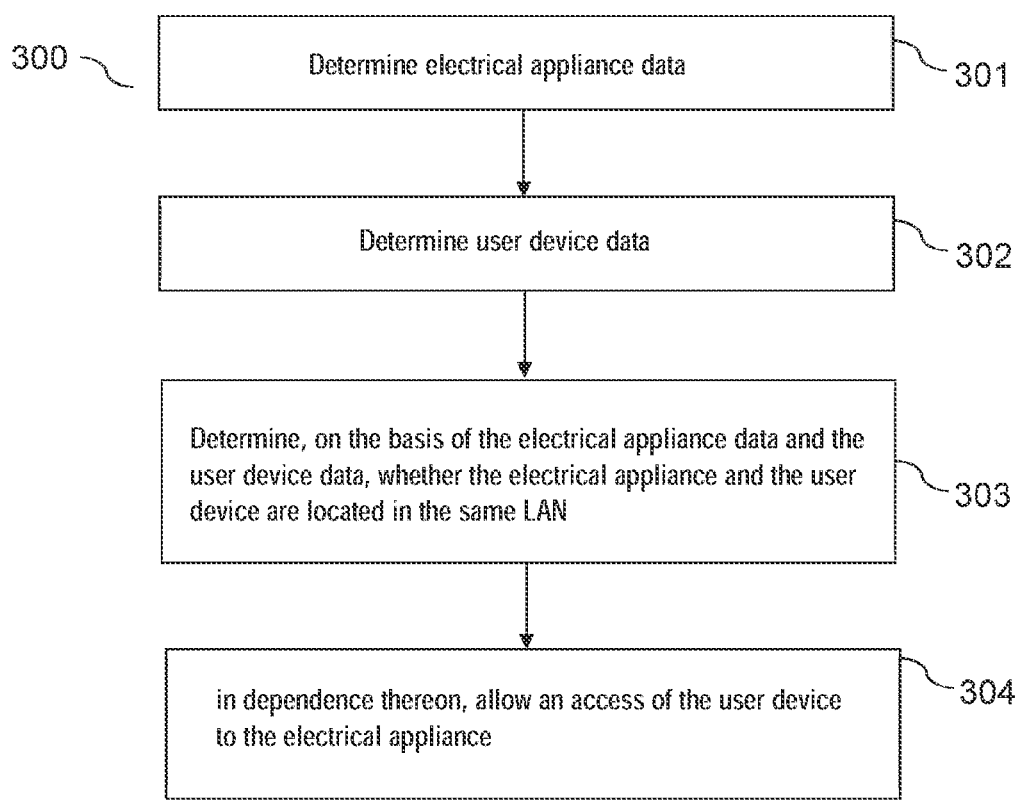
FIG. 3 shows a flow diagram of an exemplary method for controlling the access to a household appliance (as an example for an electrical appliance).

FIG. 3 illustrates a flow diagram of an exemplary (where appropriate computer-implemented) method 300 for controlling the access to an electrical appliance 110 (in particular to a household appliance) by a mobile user device 120. The method 300 comprises determining 301 electrical appliance data with regard to a data communication of the electrical appliance 110, and determining 302 user device data with regard to a data communication of the user device 120. The electrical appliance data or the user device data can comprise or indicate one or multiple of the above-mentioned parameters (for example public IP address, list of MAC addresses, run times or latencies, etc.).

Furthermore, the method 300 comprises establishing 303 on the basis of the electrical appliance data and on the basis of the user device data whether the electrical appliance 110 and the user device 120 are located in a common network 131 or not. Moreover, the method 300 comprises allowing 304 an access of the user device 120 to the electrical appliance 110 (where appropriate only) if it is established that the electrical appliance 110 and the user device 120 are located in a common local network 131.

A reliable and safe control of an electrical appliance 110 by a mobile user device 120 is rendered possible by the measures described in this document. In this case, it is possible in a reliable manner to ensure that the user of the electrical appliance 110 is located in the direct proximity of the electrical appliance 110.

Furthermore, the costs for a user interface of the electrical appliance 110 can be reduced.

The present invention is not limited to the illustrated exemplary embodiments. In particular, it is to be noted that the description and the figures are only to illustrate the principle of the proposed method and of the proposed apparatus.

The invention claimed is:

1. An apparatus for controlling access to an electrical appliance by a user device, the apparatus being configured:
   to determine electrical appliance data with regard to a data communication of the electrical appliance;
   to determine user device data with regard to a data communication of the user device;
   to determine, on a basis of the electrical appliance data and on a basis of the user device data, whether or not the electrical appliance and the user device are located in a common local communication network;
   on establishing that the electrical appliance and the user device are located in a common local communication network, to render possible an access of the user device to the electrical appliance;
   the electrical appliance data including a first list of other devices which communicate within the local communication network in which the electrical appliance is arranged;
   the user device data including a second list of the other devices which communicate within the local communication network in which the user device is arranged;
   the apparatus being configured to determine, on a basis of the first list and on a basis of the second list, whether or not the electrical appliance and the user device are located in a common local communication network and to determine an extent of an overlap between the first list and the second list, and, depending on the extent of the overlap, to determine whether or not the electrical appliance and the user device are located in a common local communication network.

2. The apparatus according to claim 1, wherein the apparatus is configured to prevent an access of the user device to the electrical appliance via a communication network upon establishing that the electrical appliance and the user device are not located in a common local communication network.

3. The apparatus according to claim 1, wherein:
   the electrical appliance data comprises data with regard to a data communication of the electrical appliance with the apparatus; and the user device data comprises data with regard to a data communication of the user device with the apparatus.

4. The apparatus according to claim 3, wherein:
the electrical appliance data indicates at least a part of a first IP address via which the electrical appliance can be reached by a communication partner outside the local communication network in which the electrical appliance is arranged; and
the user device data indicates at least a part of a second IP address via which the user device can be reached by the communication partner outside the local communication network in which the user device is arranged; and
the apparatus is configured to compare the first IP address with the second IP address in order to establish whether or not the electrical appliance and the user device are located in the common local communication network.

5. The apparatus according to claim 4, wherein at least one of the part of the first IP address or the part of the second IP address comprises a public IPv4 address or a prefix of an IPV6 address.

6. The apparatus according to claim 1, wherein:
the electrical appliance data comprises a first run time of a data communication of the electrical appliance with the apparatus;
the user device data comprises a second run time of a data communication of the user device with the apparatus; and
the apparatus is configured to compare the first and second run times with one another in order to determine whether or not the electrical appliance and the user device are located in a common local communication network.

7. The apparatus according to claim 1, wherein:
the electrical appliance data indicates a first host name of a host which renders communication with the electrical appliance possible;
the user device data indicates a second host name of a host which renders communication with the user device possible; and
the apparatus is configured to compare the first and second host names with one another in order to establish whether or not the electrical applianceand the user device are located in a common local communication network.

8. The apparatus according to claim 1, wherein each of the first list and the second list comprises MAC addresses of one or multiple other devices.

9. The apparatus according to claim 1, wherein the apparatus is configured:
on establishing that the electrical appliance and the user device are located in a common local communication network, to enable a user interface of the electrical appliance to be provided via the user device; or
on establishing that the electrical appliance and the user device are not located in a common local communication network, to prevent the user device from being used as a user interface of the electrical appliance.

10. The apparatus according to claim 1, wherein a common local communication network is a local area network or a wireless LAN.

11. The apparatus according to claim 1, wherein:
the electrical appliance is a household appliance;
the electrical appliance is a device for home automation; and/or
the user device is a device selected from the group consisting of a smartphone, a tablet PC, a desktop PC, a laptop PC, and a smart device.

12. The apparatus according to claim 11, wherein:
the household appliance is a device selected from the group consisting of a washing machine, a dryer, a dishwasher, an oven, a cooktop, and a kitchen machine; or
the device for home automation is a device selected from the group consisting of a light controller, a ventilation controller, and a television.

13. A method for controlling an access of a user device to an electrical appliance, the method comprising:
determining electrical appliance data related to a data communication of the electrical appliance;
determining user device data related to a data communication of the user device;
on a basis of the electrical appliance data and on a basis of the user device data, determining whether or not the electrical appliance and the user device are located in a common local communication network; and
allowing the access of the user device to the electrical appliance only if the electrical appliance and the user device are located in a common local communication network;
the electrical appliance data including a first list of other devices which communicate within the local communication network in which the electrical appliance is arranged;
the user device data including a second list of other devices which communicate within the local communication network in which the user device is arranged; and
determining, on a basis of the first list and on a basis of the second list, whether or not the electrical appliance and the user device are located in a common local communication network; and
determining an extent of an overlap between the first list and the second list and, depending on the extent of the overlap, determining whether or not the electrical appliance and the user device are located in a common local communication network.

* * * * *